Figures 1, 2:
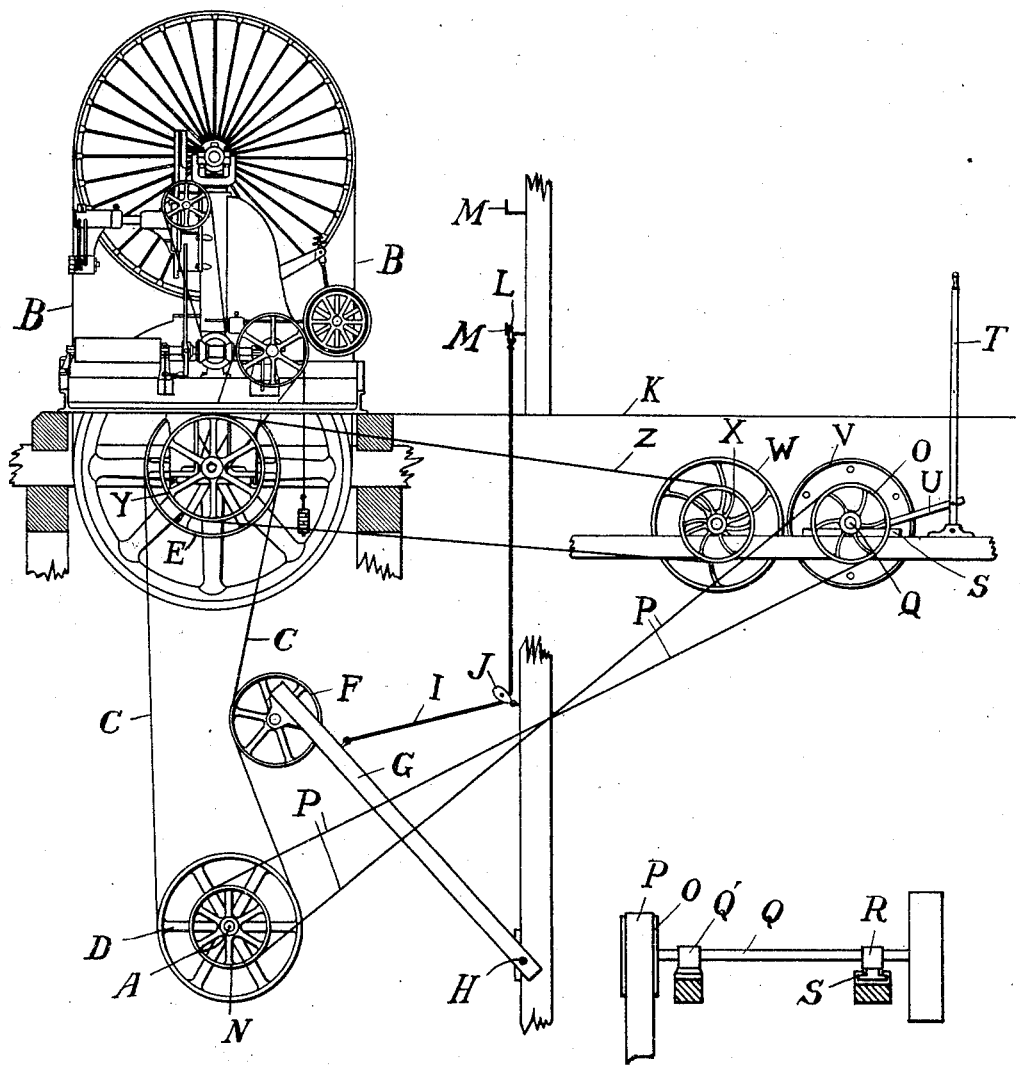

No. 788,907. PATENTED MAY 2, 1905.
E. HOOPS.
SAWMILL STARTING MECHANISM.
APPLICATION FILED OCT. 16, 1903.

WITNESSES:
Frederic J. Shaw
F. J. Larson.

Emmett Hoops
INVENTOR:
BY R. J. Elliott
ATTORNEY.

No. 788,907.	Patented May 2, 1905.

UNITED STATES PATENT OFFICE.

EMMETT HOOPS, OF TACOMA, WASHINGTON.

SAWMILL-STARTING MECHANISM.

SPECIFICATION forming part of Letters Patent No. 788,907, dated May 2, 1905.

Application filed October 16, 1903. Serial No. 177,304.

*To all whom it may concern:*

Be it known that I, EMMETT HOOPS, a citizen of the United States, residing in Tacoma, in the county of Pierce and State of Washington, have invented certain new and useful Improvements in Sawmill-Starting Mechanism, of which the following is a specification.

My invention relates to devices for starting a saw without the necessity of slowing down the engines; and the object of my invention is to enable this to be done in the simplest possible manner.

My invention is illustrated in the accompanying drawings, in which—

Figure 1 shows a side elevation of a bandsaw equipped with my starting mechanism, and Fig. 2 is a detail of the friction countershaft.

Similar letters of reference refer to similar parts throughout both views.

The present practice of sawmills is to stop the engine every time a saw is to be removed for repair, and as this takes several minutes each time and often occurs several times a day the total loss of time is considerable. This loss is unavoidable, so far as the saw is concerned; but as the present practice is to belt the saw directly to the driving-shaft, to which the remainder of the mill is also belted, it necessitates the shutting down of the entire mill, with the corresponding loss of time, every time the saw is stopped.

In my invention I drive the saw from the main driving-shaft through a belt-tightening device which enables me to stop the saw without slowing down the engine or interfering with the operation of the rest of the sawmill. On account of the necessary velocity of rotation and also of the great inertia of the parts forming the saw mechanism it is impossible to start the saw from rest by means of any belt-tightening device, if the engine maintains its normal high speed, without occasioning a dangerously-severe shock to the belting and the machinery, and therefore I have devised an intermediate frictional starting mechanism driven from the main shaft and controlled by means of a lever, so that the saw mechanism may be brought gradually from a state of rest to one of moderately-rapid rotation entirely independent of the main driving-belt and of the belt-tightener. This intermediate frictional starting mechanism consists of a friction-wheel driven by a crossed belt from the main shaft and adapted to be pressed by a lever against another friction-wheel which is belted to the shaft of the saw. Thus if the saw is at rest and the main shaft revolving at its normal speed the saw may be started by simply pressing, by means of the lever, the friction-wheels together. When the saw has attained sufficient velocity for the main belt to be tightened, the tightener is brought into action, and the strains are then assumed by the main belt, and the friction-wheels are relieved, having brought about the starting of the saw without shock to the machinery and without reducing the speed of the engine.

In the drawings the main shaft A is driven from the engine and drives the saw B by the belt C, connecting the pulleys D and E, the said belt C being loose on these pulleys, except when the idle wheel F is pressing against its slack side. This idle wheel F is mounted on the end of an arm G, pivoted at H to the sawmill-building and sufficiently heavy to tighten the belt enough to drive the saw. The position of the arm G is controlled by the rope I, which passes through the pulley J and bends upward through the operating-floor K and is provided with a ring L on its end, adapted to engage one of the hooks M, so placed that when the ring L is engaging the lower hook the idle wheel F is bearing on the belt C and when the ring L is engaging the upper hook M the wheel F is entirely disengaged from the belt. When the wheel F is in the latter position, the belt C drops away from the driving-pulley D and the saw slackens speed and finally stops. On the shaft A is also mounted the pulley N. This pulley N operates the pulley O through the belt P, which is crossed, as shown in the drawings, in order to make the pulley O rotate in the opposite direction from the pulley N. This pulley O is mounted on the shaft Q, which is mounted in bearings below the floor K. The bearing Q' for the shaft Q, near the pulley O, is of the ordinary pivoted type; but the bearing R, at the other end of the shaft Q, is mounted on the parallel ways S and is controlled therein by the hand-lever T and the link U, as shown in the drawings.

Mounted on the shaft Q, near the sliding bearing R, is the friction-wheel V, having a paper friction-surface thereon. The corresponding iron-surfaced friction-wheel W is mounted in fixed bearings. By moving the hand-lever T the shaft Q is shifted at one end and the wheel V brought into peripheral contact with the wheel W, causing it to rotate in the opposite direction—that is to say, in the same direction as the pulleys N, D, and E. Secured to the same shaft that the friction-wheel W is mounted on is the pulley X, which is connected to the pulley Y, mounted on the saw-shaft, by means of the belt Z. It is evident then that when it is desired to start the saw B all that is necessary to do is to press the rotating wheel V against the wheel W and cause it to rotate at increasing speed, the saw-wheel turning with it, and that when they are turning at nearly their normal speed the idle wheel F is allowed to press against slack side of the belt C, drawing it up, so that the pulley D will take hold and operate the saw direct. The wheels V and W may then be separated, but will continue to rotate, the wheel V being actuated from the main shaft A and the wheel W from the pulley Y on the saw-wheel. My device may be modified in some of its details without departing from the main spirit of the invention.

What I claim, and desire to secure by Letters Patent, is—

1. In a saw-starting device, the combination with the saw, of a main driving-shaft, removable means for driving said saw from said shaft, and independent intermediate friction-controlled means for driving said saw from said shaft.

2. In a saw-starting device, the combination with a main driving-shaft, of a friction-wheel driven thereby and rotating in the opposite direction thereto said friction-wheel being movable at right angles to the axis thereof, a corresponding friction-wheel mounted in fixed bearings and adapted to be engaged by said movable friction-wheel said fixed friction-wheel being connected to drive the saw, a belt connecting said main driving-shaft with the saw said belt being loose on one side, and an idle wheel adapted to press against said loose side and to tighten it.

In testimony whereof I have signed my name to this specification in the presence of two subscribing witnesses.

EMMETT HOOPS.

Witnesses:
 ELLIS LEWIS GARRETSON,
 FREDERICK J. LARSON.